(12) United States Patent
Reynolds, Jr.

(10) Patent No.: US 7,717,478 B2
(45) Date of Patent: May 18, 2010

(54) SCALLOPED WEDGE THREADS

(75) Inventor: Harris A. Reynolds, Jr., Houston, TX (US)

(73) Assignee: Hydril LLC, Houston, TX (US)

( * ) Notice: Subject to any disclaimer, the term of this patent is extended or adjusted under 35 U.S.C. 154(b) by 0 days.

(21) Appl. No.: 11/468,238

(22) Filed: Aug. 29, 2006

(65) Prior Publication Data

US 2008/0054633 A1 Mar. 6, 2008

(51) Int. Cl.
*F16L 25/00* (2006.01)

(52) U.S. Cl. .................... 285/334; 285/333; 285/355; 285/391

(58) Field of Classification Search ............. 285/390, 285/391, 333, 334, 355; 411/417, 418, 423, 411/437
See application file for complete search history.

(56) References Cited

U.S. PATENT DOCUMENTS

| | | | | |
|---|---|---|---|---|
| 2,390,624 | A | * | 12/1945 | Stone ................... 29/402.13 |
| 2,587,544 | A | * | 2/1952 | Sneddon .................. 285/333 |
| 2,827,313 | A | * | 3/1958 | Conner ..................... 285/355 |
| 3,822,902 | A | * | 7/1974 | Maurer et al. ............... 285/94 |
| RE30,647 | E | | 6/1981 | Blose |
| 4,373,754 | A | * | 2/1983 | Bollfrass et al. ............ 285/334 |
| 4,600,225 | A | | 7/1986 | Blose |
| 4,662,659 | A | * | 5/1987 | Blose et al. ................ 285/334 |
| 4,703,954 | A | | 11/1987 | Ortloff et al. |
| 4,703,959 | A | * | 11/1987 | Reeves et al. ............. 285/332.3 |
| 4,822,081 | A | * | 4/1989 | Blose ........................ 285/334 |
| 4,830,411 | A | * | 5/1989 | Tsuru et al. ................ 285/334 |
| 5,071,301 | A | * | 12/1991 | Engelhardt et al. .......... 411/389 |
| 5,221,113 | A | | 6/1993 | Stoll |
| RE34,467 | E | | 12/1993 | Reeves |
| 5,338,074 | A | * | 8/1994 | Barringer et al. ............ 285/334 |
| 5,360,239 | A | | 11/1994 | Klementich |
| 5,415,442 | A | * | 5/1995 | Klementich ................ 285/331 |
| 5,454,605 | A | | 10/1995 | Mott |
| 6,050,610 | A | | 4/2000 | Enderle |
| 6,123,364 | A | | 9/2000 | Inoue et al. |
| 6,206,436 | B1 | | 3/2001 | Mallis |
| 6,254,146 | B1 | * | 7/2001 | Church ...................... 285/334 |
| 6,283,511 | B1 | * | 9/2001 | Kamp ........................ 285/391 |

(Continued)

FOREIGN PATENT DOCUMENTS

KP 1019850004531 7/1985

(Continued)

OTHER PUBLICATIONS

International Search Report and Written Opinion dated Jan. 21, 2008 issued in corresponding PCT Application No. PCT/US2007/076526, 10 pages.

*Primary Examiner*—James M Hewitt
*Assistant Examiner*—Jay R Ripley
(74) *Attorney, Agent, or Firm*—Osha • Liang LLP (57) ABSTRACT

A threaded connection between adjacent tubular members includes a pin member providing an external wedge thread and a box member providing an internal wedge thread, wherein the internal wedge thread corresponds with the external wedge thread. Further, the threaded connection includes at least one interruption along a helical thread length of one of the external wedge thread and the internal wedge thread and at least two regions along an axial length of the threaded connection where the external wedge thread and the internal wedge thread form a thread seal.

10 Claims, 6 Drawing Sheets

U.S. PATENT DOCUMENTS

| | | | |
|---|---|---|---|
| 6,481,760 B1 | 11/2002 | Noel et al. | |
| 6,578,880 B2 | 6/2003 | Watts | |
| 6,722,706 B2 | 4/2004 | Church | |
| 6,767,035 B2 | 7/2004 | Hashem | |
| 6,877,202 B2 * | 4/2005 | Maeda | 29/407.01 |
| 6,905,149 B2 | 6/2005 | DeLange et al. | |
| 6,921,110 B2 * | 7/2005 | Morotti et al. | 285/94 |
| 2003/0168858 A1 * | 9/2003 | Hashem | 285/334 |
| 2004/0195835 A1 | 10/2004 | Noel et al. | |
| 2006/0071473 A1 * | 4/2006 | Sivley et al. | 285/333 |

FOREIGN PATENT DOCUMENTS

| | | |
|---|---|---|
| KP | 1019920020092 | 11/1992 |
| KP | 1020010007433 | 1/2001 |

* cited by examiner

SCALLOPED WEDGE THREADS

BACKGROUND OF THE DISCLOSURE

1. Field of the Disclosure

The present disclosure generally relates to wedge-threaded tubular connections. More particularly, the present disclosure relates to wedge-threaded tubular connections having a plurality of thread interruptions along a helical thread length of at least one of a pin member and a box member.

2. Background Art

Casing joints, liners, and other oilfield tubulars are frequently used to drill, complete, and produce wells. For example, casing joints may be placed in a wellbore to stabilize and protect a formation against high wellbore pressures (e.g., wellbore pressures that exceed a formation pressure) that could otherwise damage the formation. Casing joints are sections of pipe (e.g., steel or titanium), which may be coupled in an end-to-end manner by threaded connections, welded connections, or any other connection mechanisms known in the art. As such, connections are usually designed so that at least one seal is formed between an interior of the coupled casing joints and the annulus formed between exterior walls of the casing joints and the interior walls of the wellbore (i.e., the formation). The seals may be elastomeric (e.g., an o-ring seal), thread seals, metal-to-metal seals, or any other seals known to one of ordinary skill in the art.

It should be understood that certain terms are used herein as they would be conventionally understood, particularly where threaded tubular joints are connected in a vertical position along their central axes such as when making up a pipe string for lowering into a wellbore. Typically, in a male-female threaded tubular connection, the male component of the connection is referred to as a "pin" member and the female component is called a "box" member. As used herein, "make-up" refers to engaging a pin member into a box member and threading the members together through torque and rotation. Further, the term "selected make-up" refers to the threading of a pin member and a box member together with a desired amount of torque or based on a relative position (axial or circumferential) of the pin member with respect to the box member. Furthermore, the term "box face" is understood to be the end of the box member facing outward from the box threads and the term "pin nose" is understood to be the end of the pin member facing outward from the threads of the connection. As such, upon make-up of a connection, the nose of the pin is stabbed or inserted into and past the face of the box.

Referring to the geometry of threads, the term "load flank" designates the side wall surface of a thread that faces away from the outer end of the respective pin or box member on which the thread is formed and supports the weight (i.e., tensile load) of the lower tubular member hanging in the wellbore. Similarly, the term "stab flank" designates the side wall surface of the thread that faces toward the outer end of the respective pin or box member and supports forces compressing the joints toward each other such as the weight of the upper tubular member during the initial make-up of the joint or such as a force applied to push a lower tubular member against the bottom of a bore hole (i.e., compressive force).

Figures 1A, 1B:
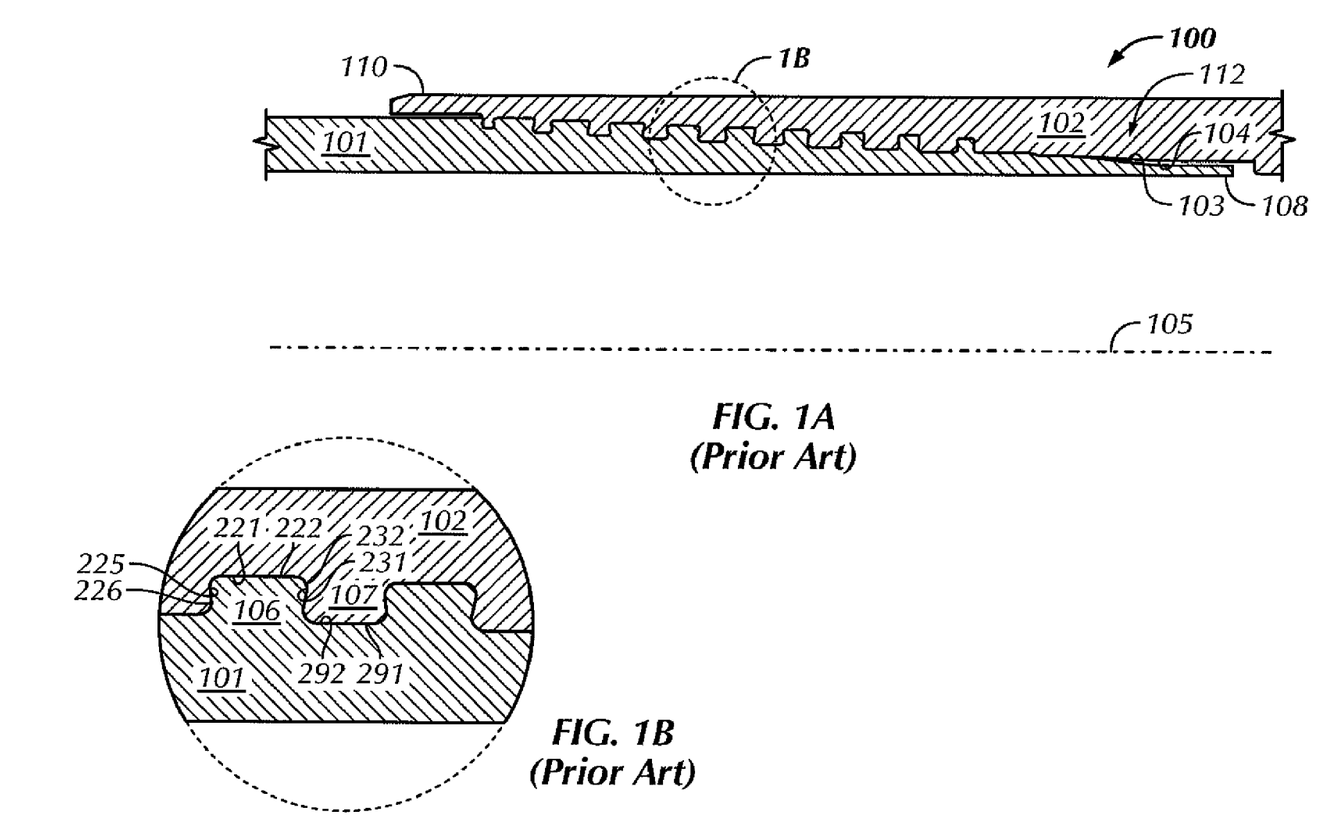
FIGS. 1A and 1B depict cross-sectional views of a prior art tubular connection having wedge threads.

One type of threaded connection commonly used in oil country tubular goods is known as a wedge thread. Referring initially to FIGS. 1A and 1B, a prior art tubular connection 100 having a wedge thread is shown. As used herein, "wedge threads" are threads, regardless of a particular thread form, that increase in width (i.e., axial distance between load flanks 225 and 226 and stab flanks 232 and 231) in opposite directions on a pin member 101 and a box member 102. The rate at which the threads change in width along the connection is defined by a variable known as the "wedge ratio." As used herein, "wedge ratio," although technically not a ratio, refers to the difference between the stab flank lead and the load flank lead, which causes the width of the threads to vary along the connection. Furthermore, as used herein, a thread "lead" refers to the differential distance between a component of a thread on consecutive threads. As such, the "stab lead" is the distance between stab flanks of consecutive thread pitches along the axial length of the connection. A detailed discussion of wedge ratios is provided in U.S. Pat. No. 6,206,436, issued to Mallis, assigned to the assignee of the present disclosure, and incorporated by reference in its entirety herein. Furthermore, wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present disclosure and incorporated herein by reference in their entirety.

Referring still to FIGS. 1A and 1B, a pin thread crest 222 in a wedge thread coupling is narrow towards a distal end 108 of pin member 101 while a box thread crest 291 is wide. Moving along an axis 105 (from right to left), pin thread crest 222 widens while box thread crest 291 narrows as it approaches a distal end 110 of box member 102. As shown in FIG. 1A, the threads are tapered, meaning that a pin thread 106 increases in diameter from beginning to end while a box thread 107 decreases in diameter in a complimentary manner. Having a thread taper may improve the ability to stab pin member 101 into box member 102 and distribute stress throughout the connection.

Generally, thread seals are difficult to achieve in non-wedge (i.e., free-running) threads. However, thread forms that are unable to form a wedge seal in a free-running configuration may create thread seals when used in a wedge thread configuration. As should be understood by one of ordinary skill, as wedge threads do not require any particular type or geometry of thread form, a variety of thread forms may be used. One example of a suitable thread form is a semi-dovetailed thread form disclosed in U.S. Pat. No. 5,360,239, issued to Klementich and incorporated herein by reference in its entirety. Another thread form includes a multi-faceted load flank or stab flank, as disclosed in U.S. Pat. No. 6,722,706, issued to Church and incorporated herein by reference in its entirety. Each of the above thread forms is considered to be a "trapped" thread form, meaning that at least a portion of the corresponding load flanks and/or corresponding stab flanks axially overlap.

An open (i.e., not trapped) thread form with a generally rectangular shape is disclosed in U.S. Pat. No. 6,578,880, issued to Watts and incorporated herein by reference in its entirety. As such, the above thread forms (i.e., those of Klementich, Church, and Watts) are examples of thread forms that may be used with embodiments of the present disclosure. Generally, open thread forms such as buttress or stub are not suitable for wedge threads, as they would impart a large radial force on the box member. However, a generally square thread form, such as that disclosed by Watts, or a trapped thread form, may be used, as they do not impart an outward radial force on the box member. As such, those having ordinary skill in the art will appreciate that the teachings contained herein are not limited to particular thread forms.

Referring again to FIGS. 1A and 1B, in wedge threads, a thread seal may be accomplished through contact pressure caused by interference that occurs at make-up over at least a portion of connection 100 between pin load flank 226 and box load flank 225 and between pin stab flank 232 and box stab flank 231. Close proximity or interference between roots 292 and 221 and crests 222 and 291 complete the thread seal when occurring proximate to such flank interference. Generally, higher pressures may be contained either by increasing interference between the roots and crests ("root/crest interference") on pin member 101 and box member 102 or by increasing the aforementioned flank interference.

Although various wedge thread connections exist having positive-stop torque shoulders (e.g., Klementich, referenced above), wedge threads typically do not have torque shoulders, so their make-up is "indeterminate," and, as a result, the relative position of the pin member and box member may vary more during make-up for a given torque range to be applied than for connections having a positive-stop torque shoulder. For wedge threads designed to have flank interference and root/crest interference at a selected make-up, the connection is designed such that both the flank interference and root/crest interference increase as the connection is made-up (i.e., an increase in torque increases flank interference and root/crest interference). For tapered wedge threads having root/crest clearance, the clearance decreases as the connection is made-up.

Regardless of the design of the wedge thread, corresponding flanks come closer to each other (i.e., clearance decreases or interference increases) during make-up. Indeterminate make-up allows for the flank interference and root/crest interference to be increased by increasing the make-up torque on the connection. Thus, a wedge thread may be able to thread-seal higher pressures of gas and/or liquid by designing the connection to have more flank interference and/or root/crest interference or by increasing the make-up torque on the connection. However, increased interference and make-up torque may increase stress on the connection during make-up, which may lead to premature failure of the connection.

Furthermore, as shown, connection 100 includes a metal-to-metal seal 112 created by contact between corresponding seal surfaces 103 and 104, respectively located on pin member 101 and box member 102. Metal-to-metal seal 112 provides an additional measure of seal integrity (i.e., when a wedge thread seal is not sufficient) for threaded connection 100, and is particularly useful where connection 100 is intended to contain high-pressure gases. While metal-to-metal seal 112 is shown located proximate to the distal end 108 of pin member 102, it should be understood by one of ordinary skill in the art that metal-to-metal seal 112 may be positioned anywhere along the length of connection 100, including, but not limited to, a location proximate to distal end 110 of box member 102.

Nonetheless, seal surfaces 103 and 104 of metal-to-metal seal 112 are usually constructed as corresponding frustoconical surfaces characterized by a low angle (e.g., an angle less than about 4 or 5 degrees) of intersection with their corresponding remaining pin 101 and box 102 surfaces. Typically, low-angle metal-to-metal seal surfaces 103 and 104 are used in conjunction with wedge thread connections (e.g., 100) because the indeterminate make-up thereof necessitates a seal capable of less precise axial alignment. As wedge threads make-up indeterminately, the relative axial position of pin member 101 and box member 102 will vary over successive make-up and breakout cycles. However, one disadvantage of a low-angle metal-to-metal seal is that seal surfaces 103 and 104 have larger friction contact areas than higher-angle seals, and as such, have less resistance to galling upon make-up. Furthermore, as low-angle metal-to-metal seals engage slowly (i.e., low radial displacement per revolution), the seals must be in contact for several revolutions. As such, in a wedge thread connection including a metal-to-metal seal, the seal is typically the first thing to "make-up," such that the initial engagement of the seal marks the "hand tight" state of such a threaded connection. Therefore, while low-angle seals are beneficial in that they accommodate the indeterminate make-up characteristics of wedge threads, they may become ineffective over repeated make-up and break-out cycles as seal surfaces 103 and 104 are deformed and/or are cold-worked out of specification.

Figure 2:
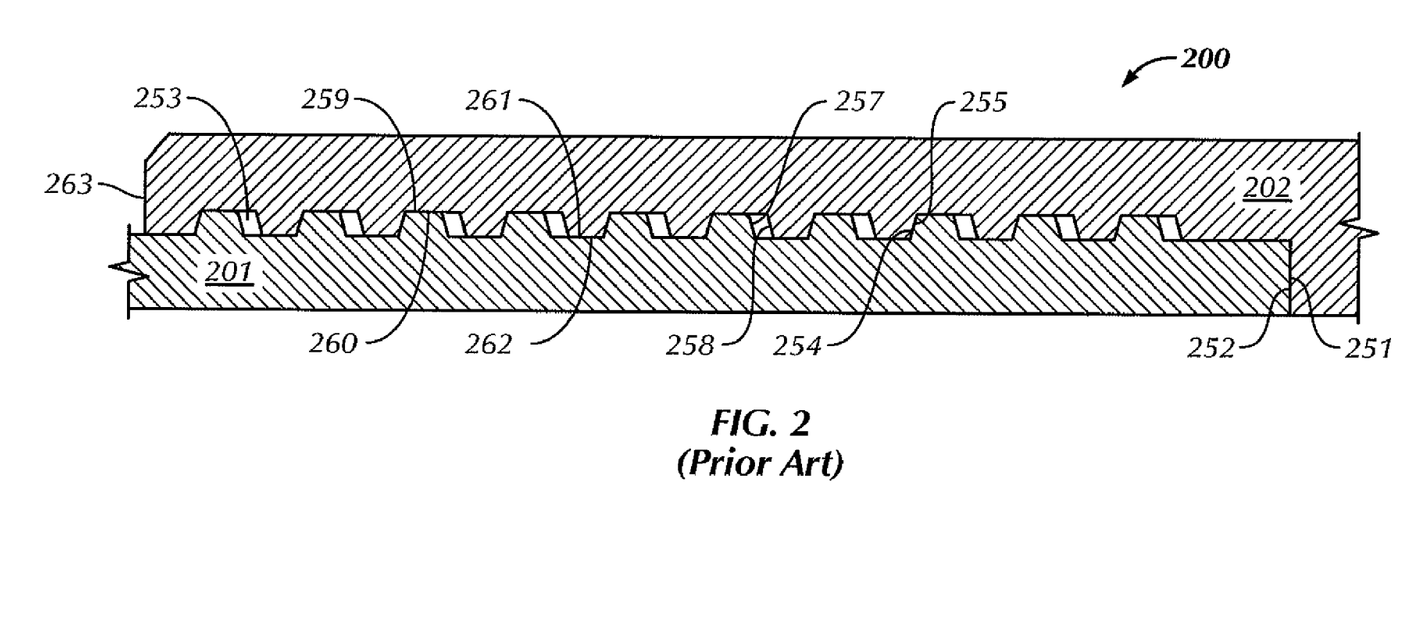
FIG. 2 is a cross-sectional view of a prior art tubular connection having free-running threads.

In contrast, free-running threads used in oilfield tubular connections typically do not form thread seals when the connection is made-up. Referring now to FIG. 2, a prior art connection 200 having free-running threads is shown. The free-running threads include load flanks 254 and 255, stab flanks 257 and 258, crests 259 and 262, and roots 260 and 261. As is typical of a connection with free-running threads, connection 200 relies on a positive-stop torque shoulder formed by the contact of surfaces 252 and 251 disposed on a pin member 201 and a box member 202, respectively. The positive-stop torque shoulder shown in FIG. 2 is commonly referred to as a "pin nose shoulder." In other connections, the positive-stop torque shoulder may instead be formed by a box face 263 and a mating shoulder (not shown) on pin member 201. The positive-stop torque shoulder may also provide a seal. Unlike wedge threads (e.g., those shown in FIGS. 1A-B), which make-up by the wedging of the pin thread 106 and the box thread 107, free-running threads rely on the positive-stop torque shoulder to load connection 200 during make-up. To make-up connection 200, pin member 201 and box member 202 are screwed together until surfaces 251 and 252 are brought into abutment, at which point pin load flank 254 and box load flank 255 are also in abutment. Additional torque is applied to pin member 201 and box member 202 to load surfaces 252 and 251 and pin load flank 254 and box load flank 255 until the desired amount of make-up torque (i.e., the selected make-up) has been applied to connection 200.

Because a large gap 253 exists between pin stab flank 257 and box stab flank 258, connection 200 does not accomplish a thread seal. Gap 253 occurs as a result of how free-running threads with positive-stop torque shoulders are loaded. Applying torque to connection 200 during make-up against the positive-stop torque shoulder causes pin member 201 to be compressed while box member 202 is stretched in tension. Note that when a box face shoulder is used, box member 202 is compressed while pin member 201 is stretched in tension. The force between pin member 201 and box member 202 is applied through pin load flank 254 and box load flank 255. Notably, pin stab flank 257 and box stab flank 258 are not loaded during make-up. This results in contact pressure between load flanks 254 and 255 and gap 253 between stab flanks 257 and 258. As discussed above, a wedge thread (e.g., FIGS. 1A-B) forms a thread seal in part because of the interference between load flanks 225 and 226 and stab flanks 232 and 231. In wedge threads, this occurs near the end of the make-up of the connection because of the varying width of pin thread 106 and box thread 107. To have similar interference between load flanks 254 and 255 and stab flanks 257 and 258 on a cylindrical (i.e., non-tapered) free-running thread, the interference would exist substantially throughout the make-up of the connection because pin thread 106 and box thread 107 have a continuous width. Furthermore, root/crest interference, if any, would exist substantially throughout the make-up of the connection. This could lead to galling of the threads and difficulty in making-up the connection.

The variance in thread width for a wedge thread occurs as a result of the load flanks having different leads than the stab flanks. A thread lead may be quantified in inches per revolution or by the commonly used inverse term "thread pitch,"

Figure 3:
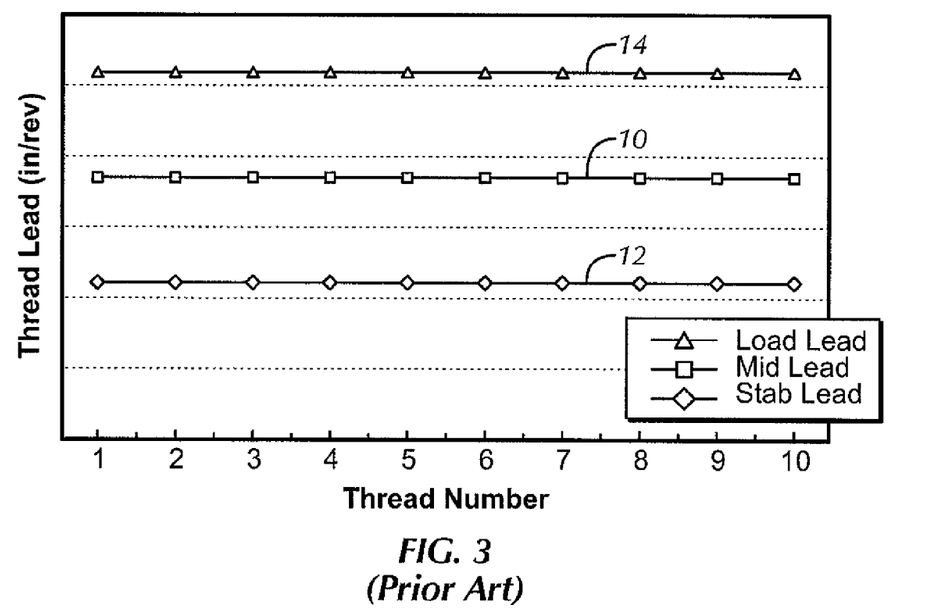
FIG. 3 shows graphical representations of thread leads for various prior art tubular connections.

(i.e., threads per inch). A graph of the leads for a wedge thread is shown in FIG. 3. For this connection, the load lead 14 is constant over the length of the connection and greater than the stab lead 12, which is also constant. The nominal lead is shown as item 10. As used herein, "nominal lead" refers to the average of load lead 14 and stab lead 12. The thread will widen with each revolution by the difference in load lead 14 and stab lead 12. As described above, the difference in the load lead 14 and the stab lead 12 is the "wedge ratio." For a free-running thread (i.e., non-wedge thread), load lead 14 and stab lead 12 would be substantially equal, thus causing the free-running thread to have a substantially constant thread width (i.e., a zero wedge ratio).

Prior to make-up, a joint compound commonly referred to as "pipe dope" is typically applied to components of a threaded connection. Pipe dope provides lubrication to aid the make-up of the connection, thus allowing for the connection to be repeatedly made-up and broken-out over time. In oilfield tubular applications, pipe dope may contain metallic particle additives, such as copper, to protect the threads of the pin and box members from friction galling during make-up and break-out. Furthermore, the base (e.g., a grease) of the pipe dope may assist a wedge-threaded connection in achieving a thread seal between load and stab flanks thereof.

Because of the close-fitting manner in which wedge threads make-up, less pipe dope is required. Typically, the pipe dope is only applied to the pin thread of a wedge thread connection with that application being performed with a brush instead of a large swab, as would be typical of other thread connections. When a wedge thread connection is made-up, excess pipe dope may become trapped between the pin thread and the box threads, which may either cause falsely elevated torque readings (leading to insufficient make-up or "stand off") or, in rare circumstances, damage the connection. Typically, problems associated with excess pipe dope on wedge-threaded connections may be avoided by restricting the amount of pipe dope applied and by controlling the speed at which the wedge-threaded connection is made-up. Limiting the make-up speed of a wedge-threaded connection allows the pipe dope to travel and squeeze out before it becomes trapped within the connection at high pressures.

Even though damage to threaded connections from overpressurized pipe dope is rare, the damage sustained thereby remains a significant concern for operators. Particularly, the connection may be damaged if the pipe dope applied is too viscous to "flow" and squeeze out of the connection. A more common scenario that may occur when making up wedge-threaded connections is pipe stand-off. Pipe stand-off refers to the situation where the connection produces a false torque reading that indicates the connection is fully made-up when it is not. Because operators make-up wedge threads based on a selected make-up torque, the connection may not be fully made-up when the relative position of the pin member and the box member is taken into account. Often, pipe stand-off is difficult to detect on the rig at the time of make-up, and even a small amount of stand-off can threaten the integrity of the connection.

In cold weather locations such as North Slope Alaska or the North Sea, failures due to inviscid pipe dope flow is more likely to occur than in warmer environments. In cold environments, a pipe dope having a lower metal content and reduced kinematic viscosity may be used to reduce the likelihood of such failures. The kinematic viscosity is the ratio of the viscosity of a fluid to its density, wherein a "centistoke" is a commonly used unit of measure for kinematic viscosity. Thus, if a pipe dope having a high kinematic viscosity is used and the connection is made-up too quickly, as may occur when using a power frame to make-up threaded connections, the pipe dope may become trapped between the pin thread and the box thread, thus causing a high pressure build-up that may either expand the box member or result in pipe stand off.

In wedge thread connections, pipe stand-off due to inadequate evacuation of pipe dope is common. As the pressure build-up may bleed off during use, the connection is at risk of accidentally backing-off during use. Therefore, stand-off in wedge-threaded connections is of particular concern as it may lead to loss of seal integrity or even mechanical separation of two connected members. Furthermore, it should be noted that pipe stand-off is of particular concern for larger diameter threaded connections, including, but not limited to tubulars greater than or equal to about 9⅝ inches diameter (24.4 cm). Because of the long helical thread length (i.e., the total length of the thread if the helix were "unraveled" and straightened out) associated therewith, dope evacuation is more difficult for larger diameter threaded connections. It has been determined that pipe dope evacuation is difficult for threaded connections having helical thread lengths in excess of 200-250 inches.

Further still, larger diameter tubulars used for threaded connections are more susceptible to ovalization from their relatively high outer diameter ("OD") to wall thickness ("t") ratios. For large diameter tubulars, (e.g., the 9⅝ inch pipe described above) the OD/t ratio may exceed 20. It has been observed that as the outer diameter (and thus the OD/t ratio) increases, it becomes increasingly difficult to manufacture tubular stock within the same cylindricity tolerance used for smaller diameter tubulars. As a result, many large diameter tubulars suffer from ovalization as they are manufactured. Furthermore, large diameter tubulars are also increasingly susceptible to ovalization resulting from extended periods of storage following manufacturing.

To combat such ovalization during the thread machining process, the chuck of a machine tool (e.g., a lathe) may be used to temporarily "straighten" out an ovalized end while the precision wedge threads are cut. However, once released from the chuck, the end of the tubular may return to its ovalized state, thus leaving the threaded portion of the stock eccentrically (i.e., non-cylindrically) shaped. Because of the loading characteristics of wedge threads, ovalized pin and box members may re-straighten themselves upon selected make-up. However, prior to selected make-up, the eccentrically shaped wedge threads may operate (in a manner similar to a scroll compressor) to dramatically pressurize the pipe dope trapped therein, thus increasing the risk of stand-off at selected make-up.

Furthermore, pipe stand-off may be particularly problematic in strings used at elevated downhole service temperatures (i.e., the temperature a tubular would expected to experience in service). Particularly, in high-temperature service (e.g., temperatures greater than 250° F., a steam-flood string, or a geothermal string), even a small amount of stand-off may be deleterious. For example, if a made-up wedge connection having even an infinitesimal amount of stand-off is deployed to a high-temperature well, the pipe dope may flow out of the wedge thread connection, thus reducing the integrity of the thread seal.

A wide range of pipe dopes is commercially available. Pipe dope is typically a proprietary formulation of lubricant(s) and particulates. In general, higher particulate concentrations result in more viscous pipe dope, which helps to provide a thread seal in wedge thread connections. The base grease is also largely determinative of the final kinematic viscosity of the pipe dope. One company providing pipe dope for threaded connections is JET-LUBE®, Inc. (Houston, Tex., USA). One type of pipe dope provided by JET-LUBE®, Inc. is KOPR-KOTE®, which contains less than 10 percent by weight of copper as the particulate additive. KOPR-KOTE® is provided in an alternative formulation for arctic use, as are several other JET-LUBE® formulations. Higher temperature pipe dopes ("thermal grade") from JET-LUBE® utilize a petroleum oil with a kinematic viscosity of 414 to 506 centistokes at 40 degrees C. The "arctic grade" pipe dopes utilize a calcium base grease with a kinematic viscosity of about 20 to 24 centistokes at 40 degrees C., which is much lower than the thermal grade. Another pipe dope is JET-LUBE® NCS-30, which is specifically marketed for use with wedge thread connections. That pipe dope does not contain metallic particulates. Instead, JET-LUBE® NCS-30 uses a proprietary formulation of chemically inert fibers as a particulate additive. Also, JET-LUBE® NCS-30 uses a calcium base grease similar to the arctic grade compounds to provide reduced kinematic viscosity.

Although many of the problems with making-up a wedge thread may be avoided by using a pipe dope with lower kinematic viscosity and/or reduced metal content, using such a compound may disadvantageously affect the sealing ability of a wedge thread. Particularly, the downhole operating environment may be much hotter than the surface, thus enabling the pipe dope to flow more easily and not aid in thread seal maintenance. In general, the higher the kinematic viscosity of the pipe dope, the better the resulting thread seal in wedge threads.

Furthermore, alternative solutions exist to temporarily modify the kinematic viscosity for the purposes of making-up a threaded connection. Such a solution is disclosed in U.S. patent application Ser. No. 11/420,441 entitled "Dope Relief Method for Wedge Thread Connections," filed on May 25, 2006, by Harris A. Reynolds, et al., and incorporated herein by reference in its entirety. In the '441 application, methods and apparatus to apply heat and/or vibration to a wedge thread connection prior to and during make-up are disclosed. As such, the applied heat will temporarily reduce the kinematic viscosity of the pipe dope so that it will flow through the connection more effectively during make-up. Similarly, the application of vibration to the connection during makeup will also temporarily reduce the kinematic viscosity of the pipe dope at make-up. The benefit of such methods and apparatus is that the kinematic viscosity may be reduced for the purpose of making-up the connection but return to the desirable properties thereafter. However, such a solution requires additional equipment to perform the heating and/or vibration that may be difficult to locate and handle in remote locations.

In addition to modifying the properties of the pipe dope compound itself, mechanical solutions for relieving pressure build-up of wedge thread connections during make-up have been proposed. An example of a mechanical solution is disclosed in U.S. Pat. No. 6,050,610, issued to Enderle, assigned to the assignee of the present disclosure, and incorporated herein by reference in its entirety. The '610 patent discloses a wedge thread connection having a groove in a thread root to provide a pipe dope escape path during make-up. Similarly, U.S. Pat. No. 6,905,149 issued to DeLange discloses a groove in a thread crest to provide a pipe dope escape path. However, it should be noted that the groove in the thread crest may prevent a wedge thread so equipped from sealing, as the groove may provide a continuous leak path for the pipe dope. Alternatively, in a two-step wedge thread, the thread crest groove may be provided on only one step such that seal integrity is not compromised.

Furthermore, the pressure-relief grooves disclosed in the '610 and '149 patents are limited in depth and width because larger grooves would reduce the strength of the threaded connection. Furthermore, such grooves work poorly because the cross-sectional areas of the grooves are too small to have an adequate flow coefficient (e.g., $C_v$) or an adequate volume to serve as an effective dope reservoir. Because of the limited size, pressure-relief grooves and other former mechanical solutions to pressure build-up of wedge thread connections during make-up may fail to prevent connection damage and pipe stand-off for problematic connections, such as larger diameter wedge thread connections.

SUMMARY OF DISCLOSURE

In one aspect, the present disclosure relates to a threaded connection between adjacent tubular members including a pin member providing an external wedge thread and a box member providing an internal wedge thread, wherein the internal wedge thread corresponds with the external wedge thread. Furthermore, the threaded connection comprises at least one interruption along a helical thread length of one of the external wedge thread and the internal wedge thread, and at least two regions along an axial length of the threaded connection where the external wedge thread and the internal wedge thread form a thread seal.

In another aspect, the present disclosure relates to a method to make a wedge threaded connection including machining a wedge thread profile upon a pin member, machining a wedge thread profile upon a box member. Furthermore, the method includes machining a plurality of interruptions along a helical thread length of one of the pin member and the box member wherein the plurality of interruptions are volumetrically sized to trap pipe dope compound from adjacent threads along the helical thread length, wherein a thread seal is formed between the pin member and the box member in at least two regions along an axial length of the wedge threaded connection when the pin member and the box member are made-up at a selected torque.

In another aspect, the present disclosure relates to a method of designing a wedge thread including specifying a wedge thread form for a pin member, specifying a wedge thread form for a box member, specifying a maximum volume of pipe dope to be applied to the pin and box members at make-up, and specifying a plurality of thread interruptions to be cut into at least one of the pin member and the box member, wherein the plurality of thread interruptions have a total volume greater than the specified maximum volume of pipe dope.

DETAILED DESCRIPTION

Selected embodiments of the present disclosure include methods and apparatus to machine threaded connections such that interruptions along a thread length of one of an external thread helix and an internal thread helix may serve to reduce a build-up in pressure of pipe dope used in the make-up of the threaded connections.

Figure 4A:
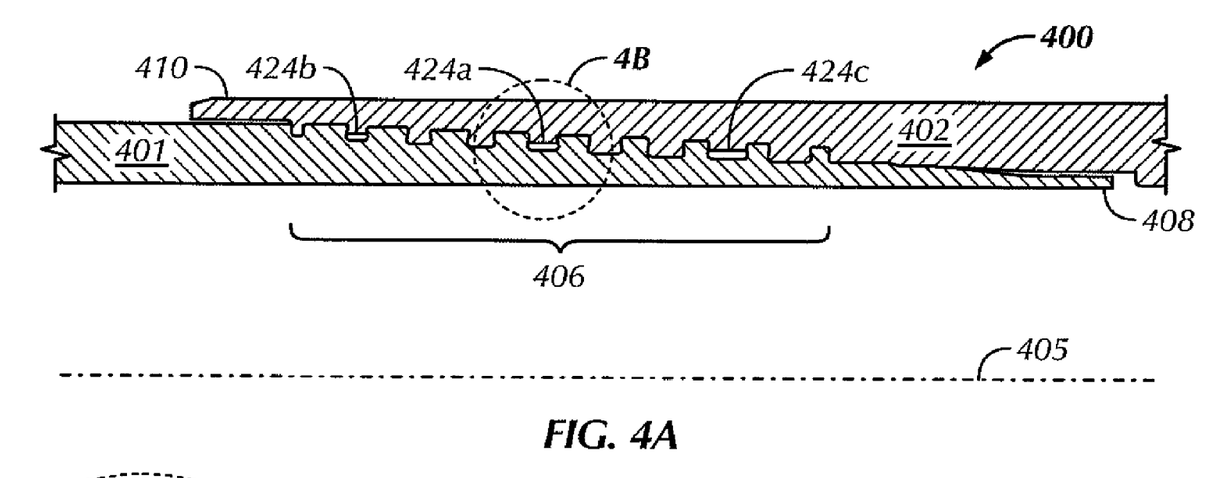
FIGS. 4A-C depict a threaded connection in accordance with selected embodiments of the present disclosure.
Figure 4B:
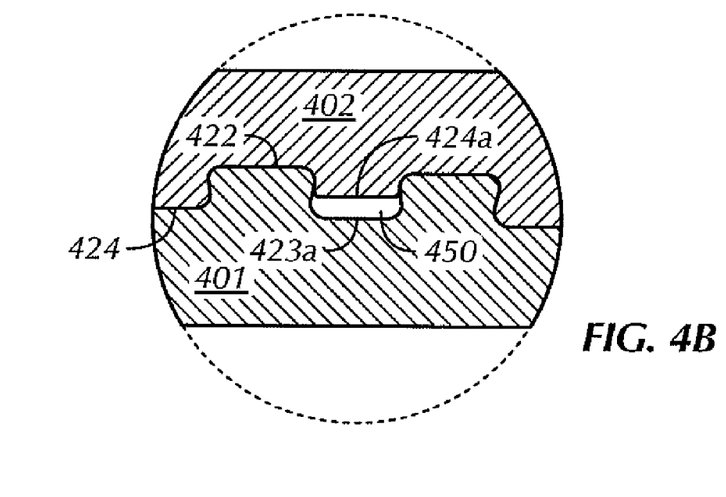
Figure 4C:
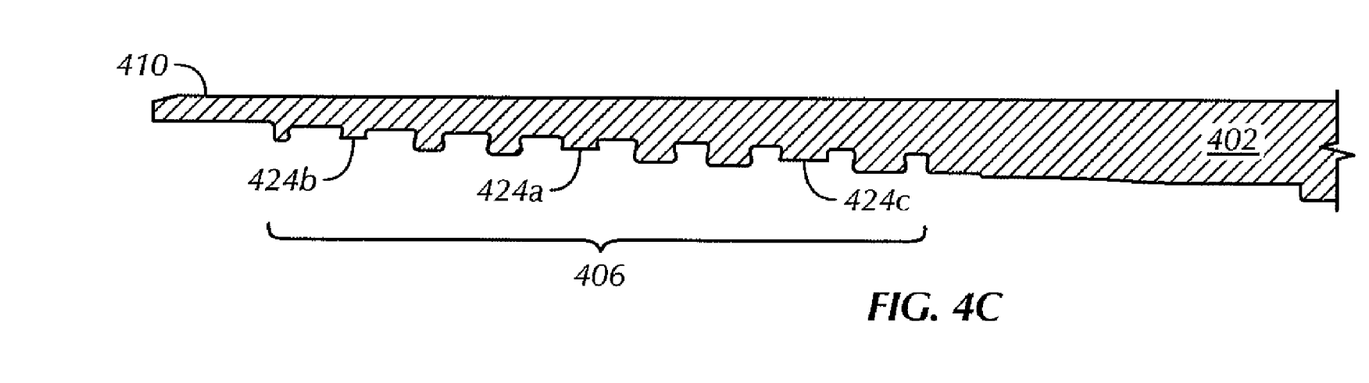

Referring now to FIGS. 4A-C, a threaded connection 400 having a pin member 401 and a box member 402 is shown. In a manner analogous to FIG. 1 described above, FIG. 4 discloses a wedge thread form at a threaded region 406 such that thread crests 422 of an external pin thread helix are narrow towards a distal end 408 of pin member 401 while thread crests 424 of a corresponding internal box thread helix are wide. Moving along an axis 405 (from right to left), pin thread crests 422 of threaded region 406 widen while the box thread crests 424 narrow as they approaches a distal end 410 of box member 402. Furthermore, while FIG. 4 discloses tapered wedge threads having a "trapped" thread form, it should be understood that any type of threads may be used in accordance with embodiments of the present disclosure. Particularly, non-tapered, free-running (i.e., non-wedge), and open threads may be used with embodiments disclosed herein without departing from the subject matter as claimed.

In threaded connection 400, box thread crests 424 are interrupted or "scalloped" at several locations along the length of threaded region 406. Referring specifically to FIG. 4B, box thread crest 424A is scalloped or interrupted such that a void 450 exists between the innermost end of thread crest 424A and a corresponding pin root 423A. As shown, threaded connection 400 includes interrupted box thread crests at three pitches, 424A, 424B, and 424C, wherein each interrupted thread pitch is approximately three thread pitches (i.e., 1080° of rotation along the helical thread length) away from the next interrupted thread pitch. While the number, depth, and location of interrupted thread crests 424A-C may be of any design contemplated by one of ordinary skill in the art, they are preferably constructed to enable pin member 401 to threadably seal with box member 402 without problems occurring associated with the build-up of pipe dope pressure.

Particularly, it has been determined, that in order to obtain a robust thread seal in a wedge-threaded connection, a selected make-up of only 1-2 continuous pitches is necessary. Therefore, as shown in FIGS. 4A-C, one embodiment of the present disclosure includes interrupted box thread crest 424B located three pitches away from interrupted box thread crest 424A, which, in turn, is located three pitches away from interrupted box thread crest 424C. Therefore, threaded connection 400 is capable of forming thread seals in two regions, one thread seal region between box crest 424B and box crest 424A, and a second thread seal region between box crest 424A and box crest 424C. Furthermore, depending on the configuration of threaded connection 400, a thread seal may also form on the one thread pitch located between box crest 424B and distal end 410 of box member 402. Similarly, depending on the configuration of threaded connection 400, a thread seal may also form on the two thread pitches located between box crest 424C and distal end 408 of pin member 401.

It should be understood that while three interrupted thread crests (424A, 424B, and 424C) are spaced apart by three pitches in FIGS. 4A-C, any spacing or number of interrupted thread crests may be used without departing from the scope of the present disclosure. Particularly, interrupted thread pitches may be axially spaced apart from each other by different amounts, depending on the particular configuration of threaded region 406. For example, a first interrupted thread crest may be positioned three pitches (i.e., 1080°) away from a second interrupted thread crest, while a third interrupted thread crest may be located two and a half pitches (i.e., 900°) away from the second interrupted thread.

In one embodiment, interrupted thread crests 424A-C may be sized and/or shaped such that excess pipe dope applied to adjacent threads may escape into voids 450 without over pressurization. Particularly, through calculation or empirical testing, an amount (i.e., a volume) of excess pipe dope may be estimated for any particular thread form and voids 450 created by interrupted thread crests 424A-C that are sized to contain that volume. For example, the volume of pipe dope applied to a threaded connection before make-up may be estimated by using a calibrated container such as a scoop of known volume to contain the pipe dope to be applied. Furthermore, a tare weight calculation for the container may be performed before and after the application of the pipe dope to the connection to determine the amount of pipe dope applied. Additionally, an acceptable amount of pipe dope may be determined for any given connection by performing empirical testing using such precisely measured amounts of pipe dope and noting the amount of resultant pipe stand-off.

Therefore, the volume for voids 450 may be determined based on the measured application of pipe dope for each particular connection. Thus, the cross section (interrupted area) and length (swept angle of rotation) of cut for interrupted thread crests 424A-C may be adjusted such that at least the amount of expected excess may escape into voids 450. Further, interrupted thread crests 424A-C may be formed along the helical length of box 402 by any method or means known to one of ordinary skill in the art of machining threads on oilfield tubulars. Therefore, embodiments of the present disclosure allow the application of adequate amounts of pipe dope to insure good lubrication of the threads and seals during make-up (i.e., preventing lubricant "starvation") while minimizing the risk of over-doping the threaded connection.

In one selected embodiment interrupted crests (e.g., 424A) may be created by "topping" or "scalloping" selected portions of box crests 424 at specified locations and for specified lengths along the helical length of threaded region 406. In constructing such topped or scalloped threads, the entire thread form of threaded region 406 may be cut on a lathe (or any another machine tool) in the same manner as ordinary threads would be cut. After completion of the thread form, a machine tool topping insert (or any other appropriate tool or insert) may then make an additional pass across the helical length threaded region 406 of box member 402, periodically engaging, and cutting away the top portions of selected thread pitches. Alternatively, using known computer numerical control ("CNC") machines, interrupted crests may be cut contemporaneously with the base thread form. As such, the transition from non-interrupted crest to interrupted crest may be of any transition known to one of ordinary skill. Particularly, the transition may be a sharp transition, a step transition, a curved transition, or a linear inclined transition.

Further still, it should be understood that while interrupted thread crests are shown in FIGS. 4A-C as flat circumferential cuts, any cut known to one of ordinary skill in the art may be used. Particularly, angled or grooved circumferential cuts in addition to radial cuts may be made without departing from the scope of the claims appended hereto. Therefore, for the purposes of this application, the term "interruptions" will be used to generically describe any periodic circumferential, radial, angled, straight, and grooved cuts along the thread length of either the internal helix of a box member or an external length of a pin member.

Additionally, as the thread interruptions are periodic in nature, it likely follows that they will not extend all the way from the beginning of a thread helix to the end. Furthermore, an interruption extending from the beginning to the end of a thread helix would not be capable of forming a thread seal.

Further, while no consistent spacing is required between each of a plurality of interrupted thread crests, it should be understood that as wedge threads are designed to create a seal between adjacent pin and box members, the spacing between adjacent interruptions must, at the very least, be sufficient to leave an uninterrupted portion capable of forming a thread seal. Thus, in selected embodiments, the plurality of thread interruptions may be of sufficient number and spacing to allow two or more portions of thread helix to form thread seals for the purpose of redundancy.

Figures 5A, 5B:
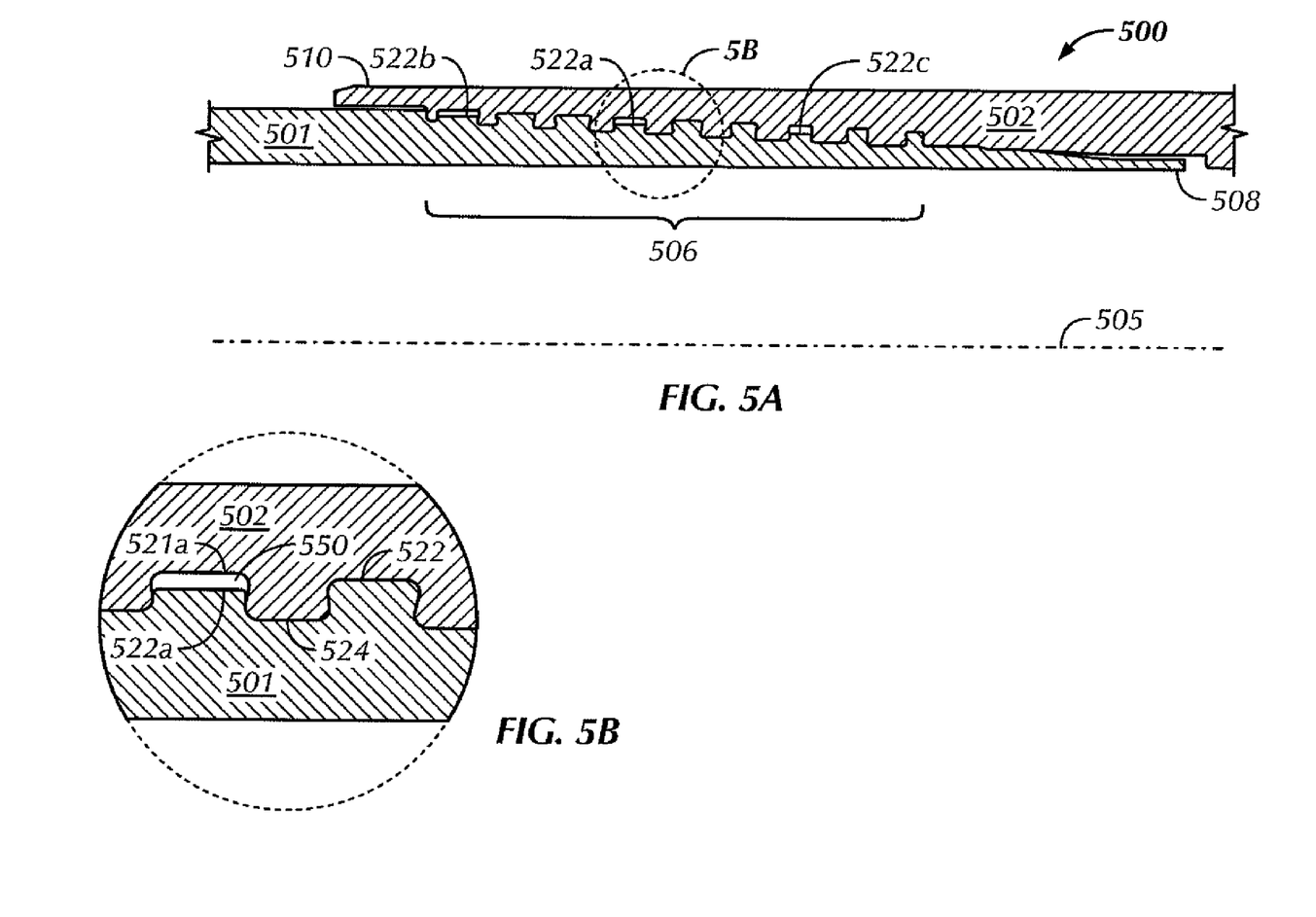
FIGS. 5A-C depict a threaded connection in accordance with selected embodiments of the present disclosure.
Figure 5C:
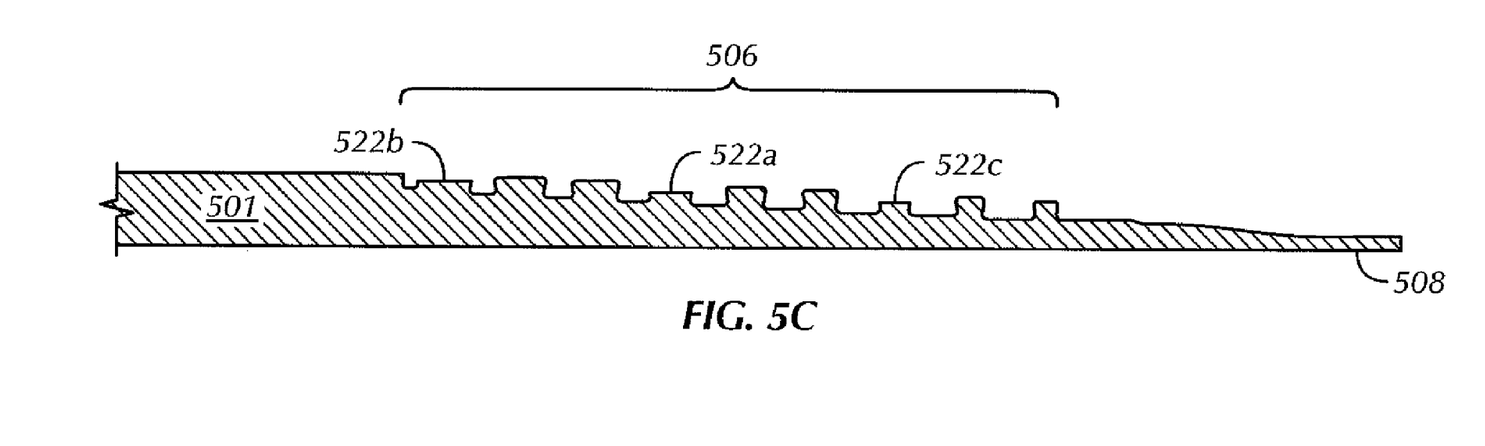

Referring now to FIGS. 5A-C, a threaded connection 500 having a pin member 501 and a box member 502 is shown. FIG. 5 discloses a wedge thread formed at a threaded region 506 such that thread crests 522 of an external pin thread helix are narrow towards a distal end 508 of pin member 501 while thread crests 524 of a corresponding internal box thread helix are wide. Moving along an axis 505 (from right to left), pin thread crests 522 of threaded region 506 widen while the box thread crests 524 narrow as they approaches a distal end 510 of box member 502. In contrast to FIGS. 4A-C, FIGS. 5A-C depict pin thread crests 522 that are interrupted or "scalloped" at several locations along the length of threaded region 506. Referring specifically to FIG. 5B, pin thread crest 522A is scalloped or interrupted such that a void 550 exists between the innermost end of thread crest 522A and a corresponding box root 521A. As shown, threaded connection 500 includes interrupted pin thread crests at three pitches, 522A, 522B, and 522C, wherein each interrupted thread pitch is approximately three thread pitches (i.e., 1080° of rotation along the helical thread length) away from the next interrupted thread pitch. While the number, depth, and location of interrupted thread crests 522A-C may be of any design contemplated by one of ordinary skill in the art, they are preferably constructed to enable pin member 501 to threadably seal with box member 502 without problems occurring associated with the build-up of pipe dope pressure.

Alternatively, a threaded connection may be constructed such that interrupted crests exist on both pin and box thread helixes. As such, each of the pin and box member may contain multiple thread crest interruptions that may coincide to create a thread dope void larger than would be created on just one of the pin and box member. Alternatively still, the threaded connection may be constructed such that the total number of thread crest interruptions is divided among the pin and box member, such that the pipe dope voids created thereby are alternately created in the box and pin members. For example, in reference to FIGS. 4-5, a threaded connection combining pin crest interruptions 522B and 522C of FIG. 5 with box crest interruption 424A may be envisioned. Similarly, a connection combining box crest interruption 522A of FIG. 5 with pin crest interruptions 424B and 424C of FIG. 4 may also be envisioned.

Advantageously, embodiments of the present disclosure present threaded connections whereby over-pressurization of pipe dope may be prevented without having to use an alternative pipe dope compound. Furthermore, using apparatus and methods in accordance with the present disclosure, large-diameter threaded connections may be capable of being threadably connected with reduced risk of stand-off and over pressurization of pipe dope associated with eccentric cross-sections and long helical thread length. Finally, embodiments of the present disclosure present pipe dope relief schemes for threaded connections that may not risk the integrity of the thread seal between adjacent pin and box members.

While the subject matter has been described with respect to a limited number of embodiments, those skilled in the art, having benefit of this disclosure, will appreciate that other embodiments can be devised which do not depart from the scope as disclosed herein. Accordingly, the scope of the invention should be limited only by the attached claims.

What is claimed:

1. A downhole threaded connection between adjacent tubular members, the threaded connection comprising:
    a pin member providing a single continuous external wedge thread;
    a box member providing a single continuous internal wedge thread;
    wherein the internal wedge thread corresponds with the external wedge thread;
    a plurality of interruptions formed in thread crests of the external and internal wedge threads and arranged along helical thread lengths of the external and internal threads;
    wherein the plurality of interruptions are spaced along the helical thread lengths such that a helical thread length of at least two revolutions of continuous root/crest contact exists between at least two of the plurality of interruptions;
    wherein the plurality of interruptions are volumetrically sized to trap pipe dope from adjacent threads along the helical thread lengths.

2. The threaded connection of claim 1, wherein the plurality of interruptions are equally spaced along the helical thread lengths.

3. The threaded connection of claim 1, wherein at least one of the adjacent tubular members has an outer diameter at least 20 times greater than a wall thickness.

4. The threaded connection of claim 1, wherein the helical thread length of the one of the pin member and the box member is greater than about 200 inches.

5. The threaded connection of claim 1, wherein the helical thread length of the one of the pin member and the box member is greater than about 250 inches.

6. The threaded connection of claim 1, wherein a helical thread length of the other of the pin member and the box member is greater than about 200 inches.

7. The threaded connection of claim 1, wherein the helical thread length of the other of the pin member and the box member is greater than about 250 inches.

8. The threaded connection of claim 1, wherein at least one of the pin member and the box member has an eccentric cross section prior to make-up.

9. The threaded connection of claim 1, wherein at least one interruption comprises a circumferential cut.

10. The threaded connection of claim 1, wherein at least one interruption comprises a radial cut.

* * * * *